United States Patent [19]

Stumpf

[11] 4,439,977

[45] Apr. 3, 1984

[54] METHOD AND APPARATUS FOR MAKING A SERIES OF POCKETED COIL SPRINGS

[75] Inventor: Walter Stumpf, Munster, Ind.

[73] Assignee: Simmons U.S.A. Corporation, Atlanta, Ga.

[21] Appl. No.: 284,240

[22] Filed: Jul. 16, 1981

Related U.S. Application Data

[63] Continuation of Ser. No. 793,949, May 5, 1977, abandoned.

[51] Int. Cl.³ ........................ B29C 27/08; B32B 31/20; B65B 35/56

[52] U.S. Cl. ........................................ 53/428; 53/114; 53/438; 53/450; 53/529; 53/550; 156/70; 156/73.1; 156/200; 156/290; 156/352; 156/365; 156/383; 156/464; 156/465; 156/497; 156/553; 156/580.1; 156/580.2; 156/583.1

[58] Field of Search ................ 156/70, 73.1, 290, 292, 156/358, 365, 383, 200, 461, 464, 465, 308.4, 352, 497, 553, 580.1, 580.2, 583.1; 53/114, 428, 246, 548, 450, 455, 550, 553, 562, 438, 529; 140/149; 5/477

[56] References Cited

U.S. PATENT DOCUMENTS

| | | | |
|---|---|---|---|
| 1,183,993 | 7/1931 | Gail | 53/114 |
| 2,032,510 | 3/1936 | Spuhl | 53/114 |
| 3,329,550 | 7/1967 | Kucheck | 156/497 |
| 3,492,783 | 2/1970 | Dohmeier | 53/186 |
| 3,562,041 | 2/1971 | Robertson | 156/73.1 |
| 3,634,170 | 1/1972 | Hottendorf | 156/502 |
| 3,668,816 | 6/1972 | Thompson | 53/28 |
| 3,785,902 | 1/1974 | Preston | 156/504 |
| 3,817,802 | 6/1974 | Meyer | 156/73.1 |

*Primary Examiner*—Michael G. Wityshyn
*Attorney, Agent, or Firm*—Fitch, Even, Tabin & Flannery

[57] ABSTRACT

A method and apparatus are disclosed for making a series of coil springs pocketed within individual pockets in an elongate fabric strip comprised of two overlying plies capable of being thermally welded together. The fabric strip is fed along a guide path during which compressed coil springs are inserted between the piles with the axes of the springs substantially normal to the planes of the plies, whereafter the fabric plies are thermally welded together longitudinally and transversly to form a series of connected pocketed springs. After thermal welding, the pocketed springs are passed through a turner assembly during which the coil springs are reoriented within the fabric pockets to positions wherein the axes of the springs are transverse to the fabric strip.

20 Claims, 15 Drawing Figures

6.

7
6.
120a
138a
32
142
118a
138a
140
142
132
130
80
144
112a
84
108a
82
26
94
78
136a
128
150
98
100
102
7
146
148

26
158
164a
162
44a
166a
156
168
166
44
50
50a
278
278a
286a
288
44a
168a
166a
298
296
254
234
252
236
34
256
170
224
260
238
242
232
244
234
248
272a
258
222
206b
212
250
172
206a
230a
48
170a
172a
44
156
168

12
12
14
14
298
316
322b
320b
318b
296
300
334
302b
374
372
362
338
348
344b
364
366
340b
342b
388
330
332
352
378
382
380
380a
380b
354
368
360
346
358
356
390
58
22
384
386

METHOD AND APPARATUS FOR MAKING A SERIES OF POCKETED COIL SPRINGS

This is a continuation of application Ser. No. 793,949 filed May 5, 1977 now abandoned.

The present invention relates generally to the art of spring assembling, and more particularly to a novel method and apparatus for making a series of connected individually pocketed coil springs for mattresses and cushions having the so-called Marshall construction.

In the so-called Marshall construction, each coil spring is encased within its own fabric sack, which is generally made in the form of a pocket defined between two plies of a fabric strip connected together at intervals along transverse lines spaced along the strip. The two-ply strip is generally formed by folding a strip of double width fabric upon itself along its longitudinal centerline, leaving the overlapped plies along the unjoined opposite edge of the strip to be connected to each other to close the pockets defined between the transverse lines of connection after the springs are inserted.

In accordance with one known method and apparatus for inserting and compressing coil springs between opposed plies of a fabric strip and thereafter securing the plies transversely and longitudinally to form closed pockets, the plies of fabric are secured by thread stitching. See, for example, U.S. Pat. No. 1,733,660, dated Oct. 29, 1929, and No. 1,813,993, dated July 14, 1931, both of which are assigned to the assignee of the present invention. The mechanical requirements upon sewing machines for accomplishing the requisite stitching in making series connected individually pocketed springs are severe, and the mechanisms required for moving the sewing machines in relation to the fabric strip, particularly in accomplishing the transverse stitching which defines the pockets, has of necessity been complicated. The productivity of such machines is generally limited by the limitations of the sewing machines, including the problem of thread breakage.

It is one of the primary objects of the present invention to provide an improved method and apparatus for making series-connected individually pocketed springs for mattresses, cushions and the like which provide significant economic and production advantages over the prior art methods and apparatus.

A more particular object of the present invention is to provide a method and apparatus for making series connected individually pocketed springs wherein an elongate fabric strip comprised of two overlying plies capable of being thermally welded together is passed along a guide path during which compressed coil springs are inserted between the plies whereafter the plies are thermally welded transversely of the strip between successive springs and also longitudinally of the strip to establish individual spring pockets.

Another object of the present invention is to provide a method and apparatus for making a series of connected individually pocketed coil springs wherein the pockets are defined by transverse and longitudinal thermal welds which in the described embodiment are formed by ultrasonic weld heads.

Another object of the present invention is to provide apparatus for making series of connected, individually-pocketed springs which has provision for inserting compressed coil springs at spaced intervals along the length of and between plies of a two-ply fabric strip, the springs being inserted with the coil axes substantially perpendicular to the planes of the strip plies, whereafter the fabric plies are selectively secured together along transverse and longitudinal weld lines to form individual spring pockets, and including novel means to facilitate turning of the springs within the pockets such that the axes of the coil springs lie longitudinally of their respective pockets.

A feature of the present invention is the provision in a machine for forming series of connected pocketed coil springs of means for cramping the spring-filled strip against one side of a guide path traversed by the strip as it passes through a turner assembly so as to resist the side thrust of turner paddles and facilitate expansion of the springs into the unoccupied pocket ends during turning of the compressed coil springs, with the result that turning of the springs is made easier and more uniform.

Another feature of the appartus for making series of connected pocketed coil springs in accordance with the present invention lies in its ability to readily accommodate changes in spring pocket size with relatively minor adjustment to the apparatus.

Further objects and advantages of the present invention, together with the organization and manner of operation thereof, will become apparent from the following detailed description of the invention when taken in conjunction with the accompanying drawings wherein like reference numerals designate like elements throughout the several views, and wherein.

GENERAL DESCRIPTION

Figure 1:
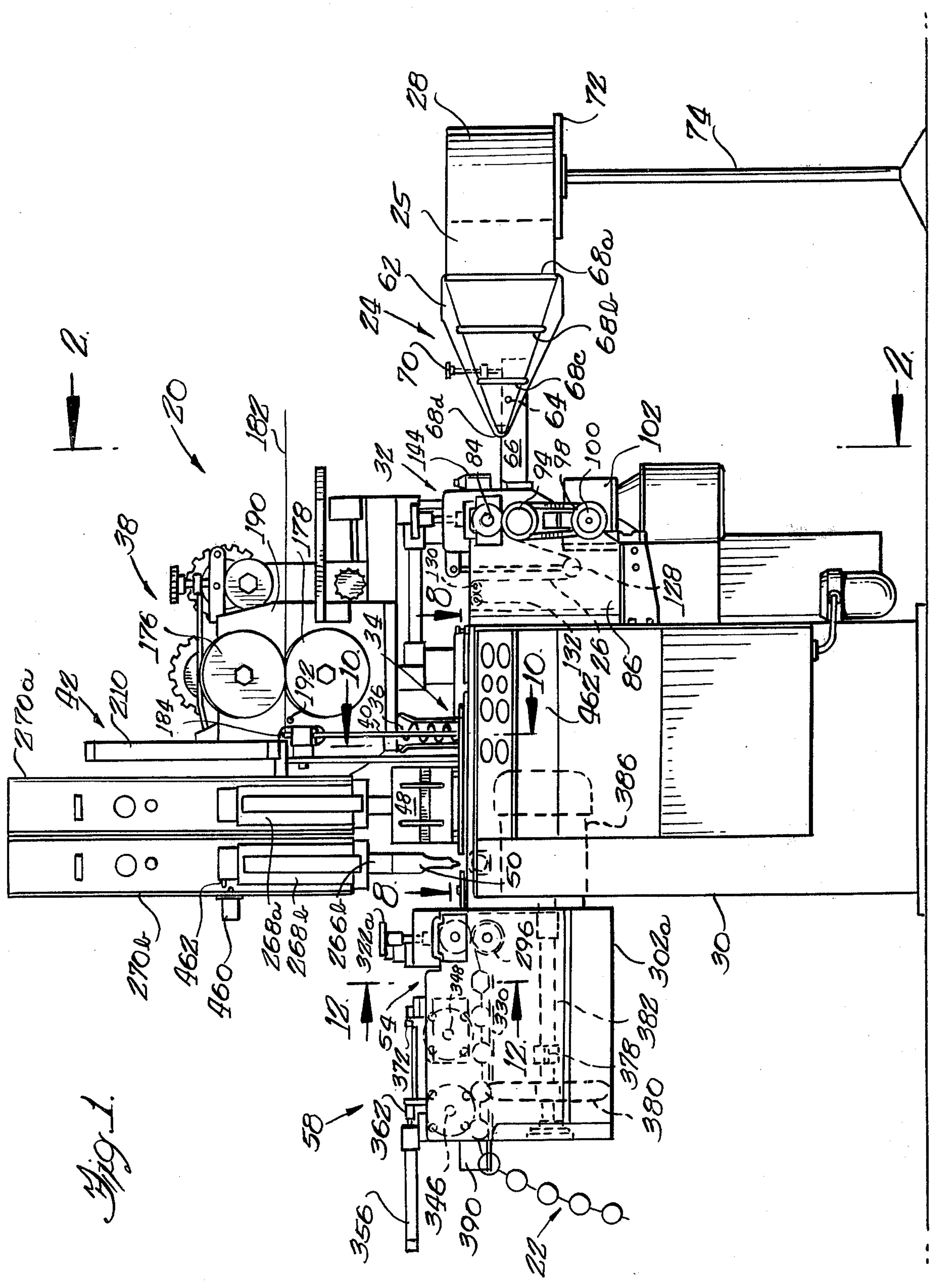
FIG. 1 is a front elevational view of a pocket machine for forming series connected pocketed coil springs in accordance with the present invention.
Figure 2:
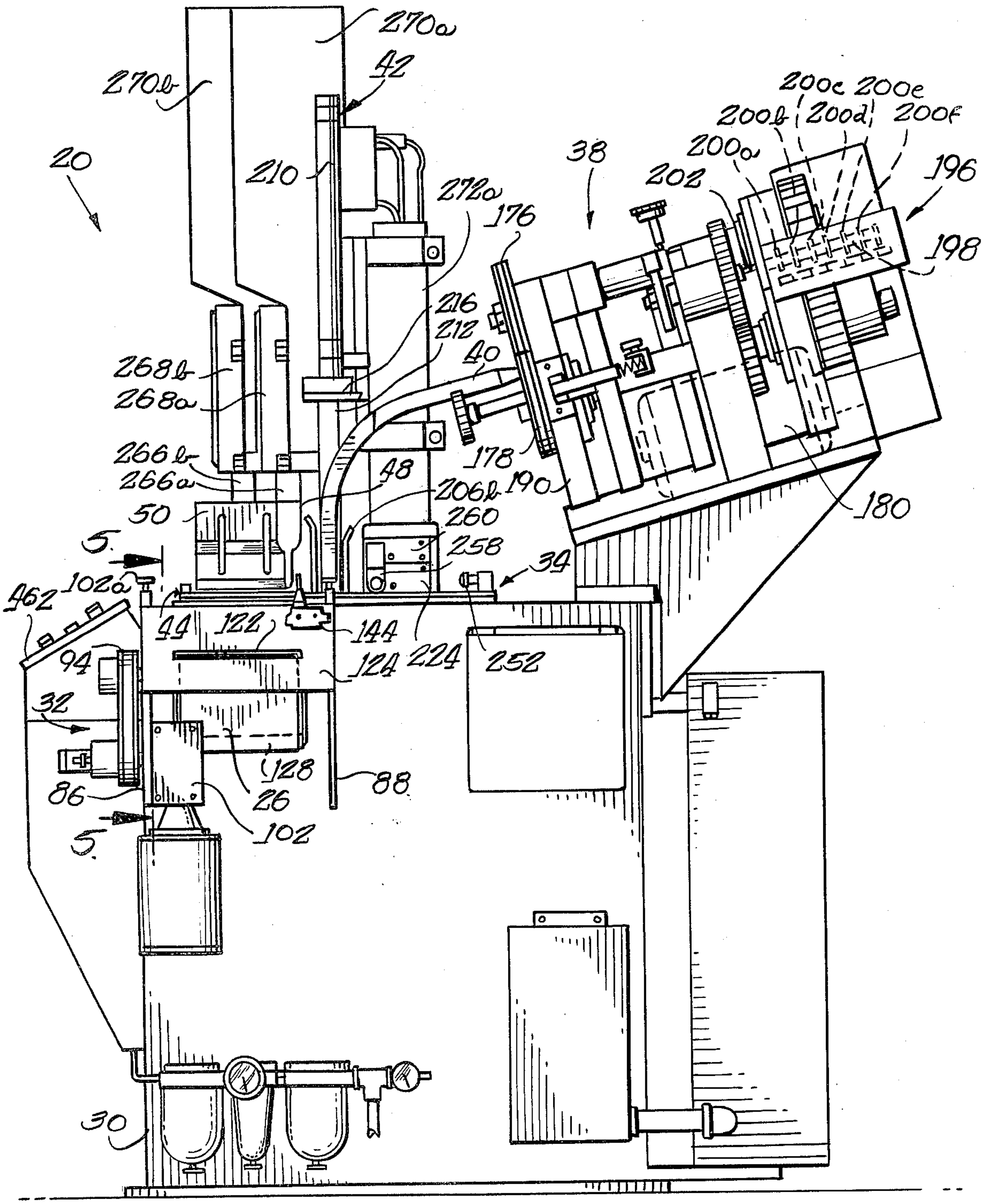
FIG. 2 is a side elevational view of the machine of FIG. 1, as though taken along the line 2—2 of FIG. 1, i.e. with the fabric supply reel removed.
Figure 3:
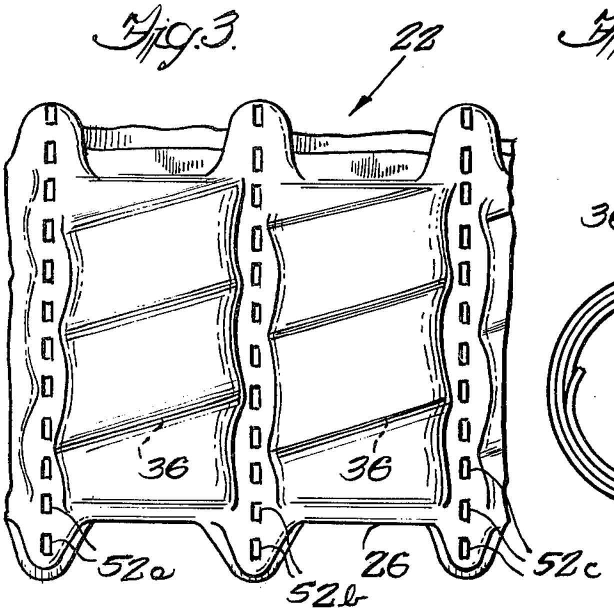
FIG. 3 is an elevational view of a series of connected pocketed coil springs made in accordance with the method and machine of FIG. 1.

Referring now to the drawings, and in particular to FIGS. 1 and 2, an appartus for making a series of connected pocketed coil springs in accordance with the present invention is indicated generally at 20. The apparatus 20, which may hereinafter be termed the "spring pocketing apparatus" or "pocket machine", is adapted to make a series of connected pocketed coil springs for use in the manufacture of mattresses or cushions or the like wherein the series of pocketed springs takes the form of a strip of integrally connected closed fabric pockets each containing a helically coiled wire spring. A portion of a strip of integrally connected pocketed coil springs made in accordance with the apparatus 20 is indicated generally at 22 in FIGS. 1 and 3.

Very generally, the pocket machine 20 includes a fabric folder, indicated generally at 24, which is adapted to receive a length of a suitable thermally weldable fabric sheet 25 from a supply roll 28 and fold the fabric sheet along its longitudinal center line to form an elongate fabric strip 26 comprised of two overlying plies. One edge of the two-ply strip, termed the forward edge, is thus defined by the longitudinal fold. The pocket machine 20 includes a rectangular base frame 30 in the form of a box-like floor-mounted weldment whose flat upper surface provides a guide path along which the fabric strip 26 is guided during the formation of the continuous strip of pocketed springs 22.

From the folder 24, the fabric strip 26 is fed through a material feed roll assembly, indicated generally at 32, which draws the fabric strip from the supply reel, through the folder, and feeds it to the guide path defined on the upper surface of the base frame 30. The strip is drawn through the guide path by indexing rolls 54, which are driven intermittently and in synchronsim with other operations performed on the fabric strip in the guide path.

Figure 4:
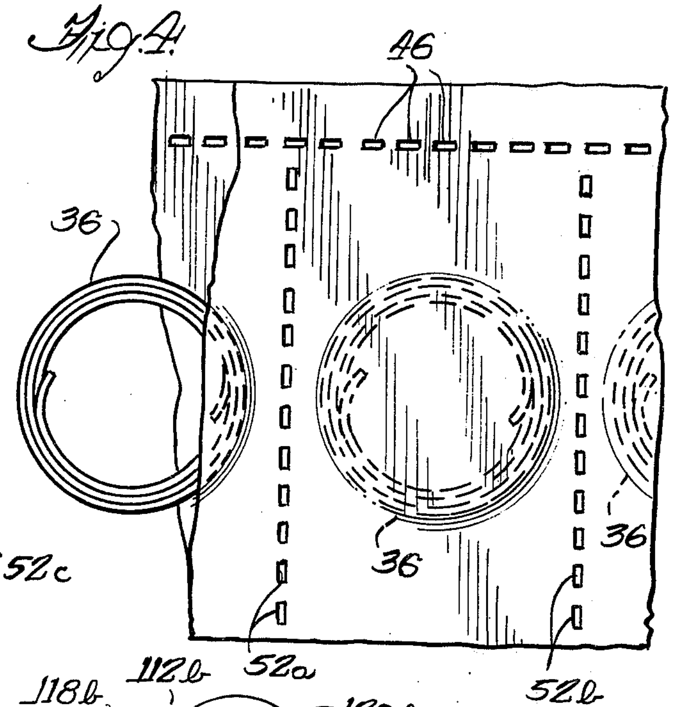
FIG. 4 is a plan view of a portion of a fabric strip after insertion of compressed coil springs between the plies and welding to individually pocket the springs but prior to turning the springs within the pockets to obtain the product of FIG. 3.

As the fabric strip passes through the guide path, to be described in greater detail hereinbelow, the overlying plies are separated by a coil spring inserter assembly, indicated generally at 34, which is adapted to receive herlically coiled wire springs, one of which is indicated at 36 in FIG. 1, in successive order from a coiler assembly, indicated generally at 38. The successive coil springs 36 are guided to the spring inserter assembly 34 from the coiler assembly 38 on a delivery horn 40 and are compressed by a compressor assembly 42 whereafter each compressed coil spring is inserted between the plies of the fabric strip 26. The coil spring inserter assembly 34 is coordinated with movement of the fabric strip 26 along the guide path so that compressed coil springs are inserted between the plies of the fabric strip at equidistantly spaced positions along the length of the fabric strip. The compressed springs are maintained in compressed conditions between the plies of the fabric strip by a coil retainer plate 44 mounted on the upper surface of the base frame 30. As the fabric strip and interposed compressed springs 36 are moved along the guide path, the overlying plies are thermally welded together adjacent their free edges opposite and parallel to the longitudinal fold edge along a weld line indicated at 46 in FIG. 4. The weld line 46 is effected at a sealing or welding station which includes first and second thermal weld head means 48 and 50, respectively. The first weld head means 48 is adapted to effect thermal welding of the fabric plies along the longitudinal weld line 46. Simultaneously with securing the fabric plies together along the longitudinal weld line 46, the fabric plies are also secured together intermediate each successive coil spring 36 by the second thermal weld head 50 which is operative to form transverse weld lines such as indicated at 52*a*, *b* and *c* in FIGS. 3 and 4. As will be described more fully hereinbelow, in the illustrated embodiment of the pocket machine 10, the weld heads 48 and 50 comprise ultrasonic weld heads which are adapted to ultrasonically weld the fabric plies together along the longitudinal and transverse weld line 46 and 52*a-c*, etc., respectively, so as to form a spring retaining pocket for each of the coil springs 36 along the longitudinal length of the fabric strip 26.

Insertion of the compressed coil springs 36 and thermal welding of the fabric plies to form the spring retaining pockets takes place when the fabric strip is in an at-rest or stationary condition relative to the base frame 30. Intermittent movement of the fabric strip 26 along the guide path underlying the coil retainer plate 44 is effected by the indexing rolls 54 which constitute indexing drive means. As will be described in greater detail hereinbelow, the indexing drive means 54 is operative to effect intermittent advancement of the fabric strip along the guide path so that the fabric strip is in an at-rest condition during thermal welding of the fabric plies.

After sealing the overlying plies of fabric strip 26 to form a closed pocket about each compressed coil spring 36, the fabric strip is advanced to a turner assembly, indicated generally at 58, which is supported by the base frame 30 and is operative to turn or rotate the coil springs 36 within their respective closed pockets from positions wherein the longitudinal axes of the coil springs are substantially perpendicular to the planes of the fabric plies to positions wherein the axes of the coil springs are substantially parallel to and coplanar with the transverse weld lines 52a, b, c etc. In the latter turned positions, the coil springs 36 are expanded from their initially compressed conditions and lie lengthwise of their respective pockets in the strip 22 of integrally connected pocketed springs.

The several functions described are powered variously by electric motor and compressed air, and coordinated by a control circuit which prevents energizing of the weld heads 48 and 50 if a coil spring 36 should accidentally become fouled in the spring inserter assembly 34, and prevents the energizing of the thermal weld head 50 if the indexing mechanism should advance the strip at other than the predetermined distance and inadvertently deposit a compressed coil spring below the weld head 50 as it approaches its weld position.

FABRIC SUPPLY AND FOLDER

The fabric folder 24 may take any of the wellknown forms for folding the sheet of fabric 25 as it is drawn from the roll 28. In the illustrated embodiment, the fabric folder 24 includes a vertical support plate 62 which is pivotally mounted at 64 to a horizontal support bar 66 which, in turn, is supported by the base frame 30. The support plate 62 has a plurality of generally U-shaped folding guide elements 68*a-d* each of which may comprise a pair of parallel closely spaced guide rods between which the fabric 26 is drawn and which are adapted to fold the fabric sheet 25 along its longitudinal centerline to form a fabric strip comprised of two overlying plies as the fabric strip exits from the guide element 68*d*. A hand adjustment screw 70 is operatively connected between the support plate 62 and the support bar 66 so as to facilitate adjustment of the guide axis of the folding elements 68*a-d* as desired.

The fabric supply roll 28 may be supported in any suitable fashion such as by a rotatable support table 72 on a support stand 74.

MATERIAL FEED

Figure 6:
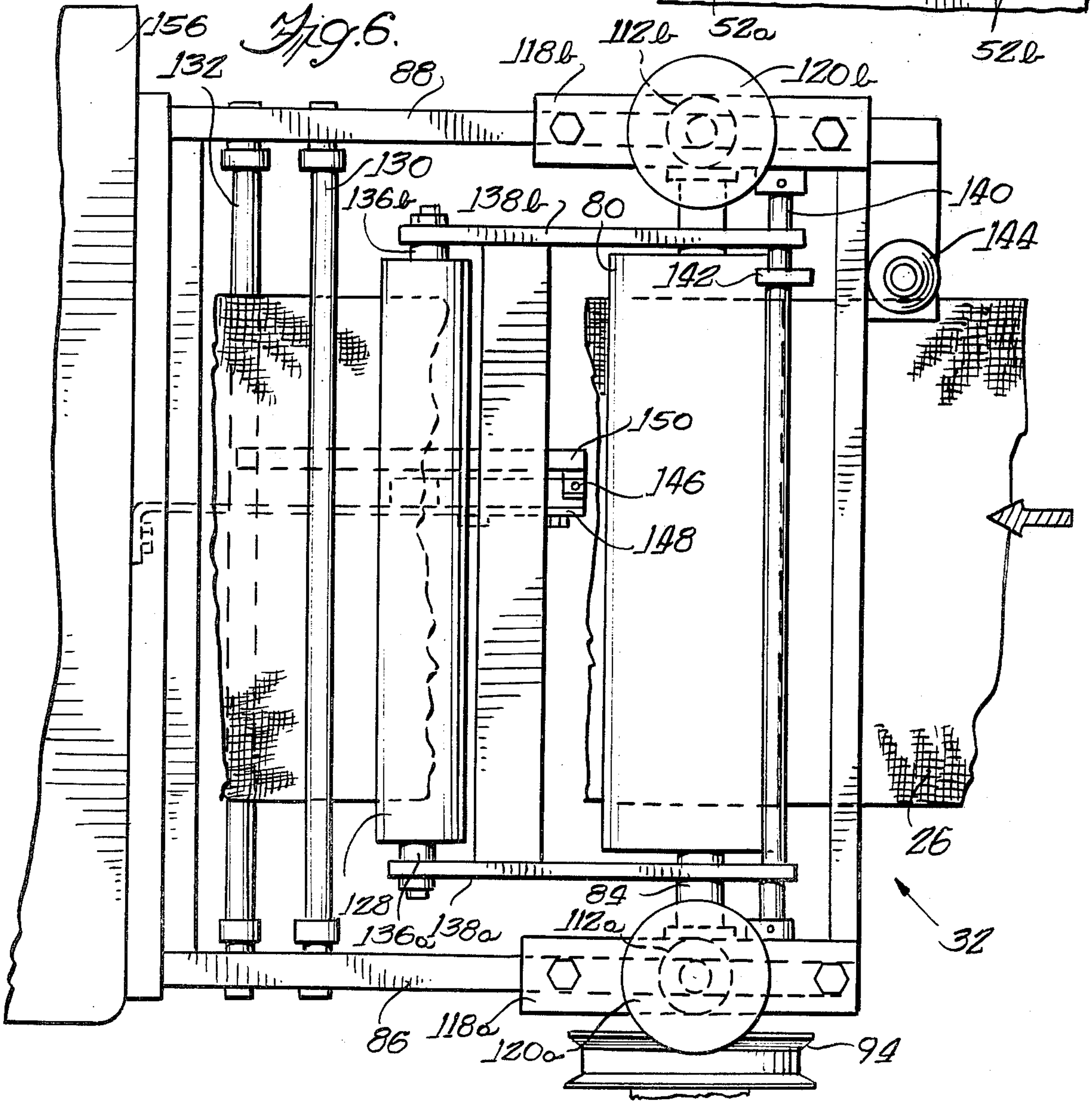
FIG. 6 is a plan view taken substantially along the line 6—6 of FIG. 5.
Figure 5:
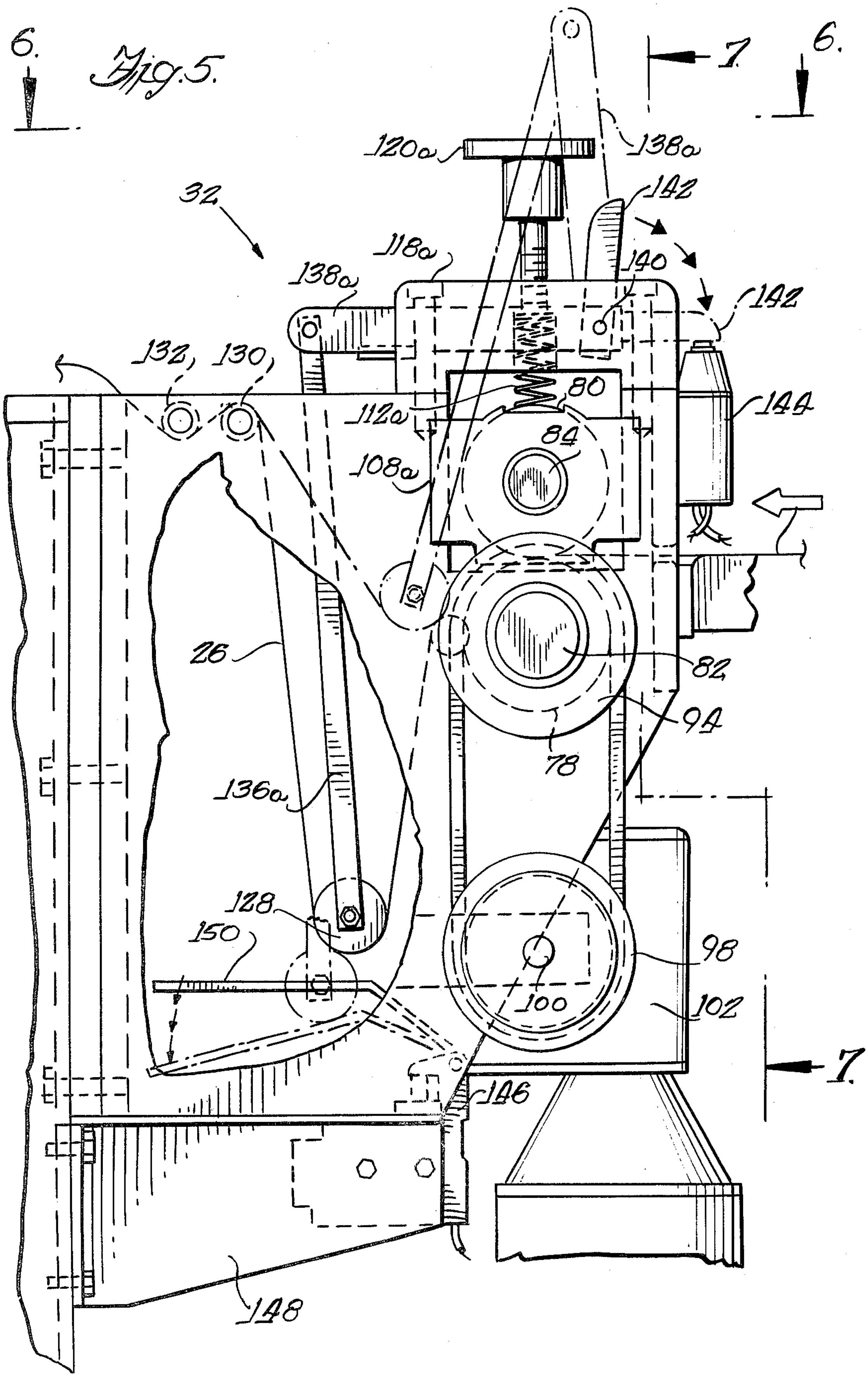
FIG. 5 is an enlarged partial sectional view taken substantially along the line 5—5 of FIG. 2, looking in the direction of the arrows.
Figure 7:
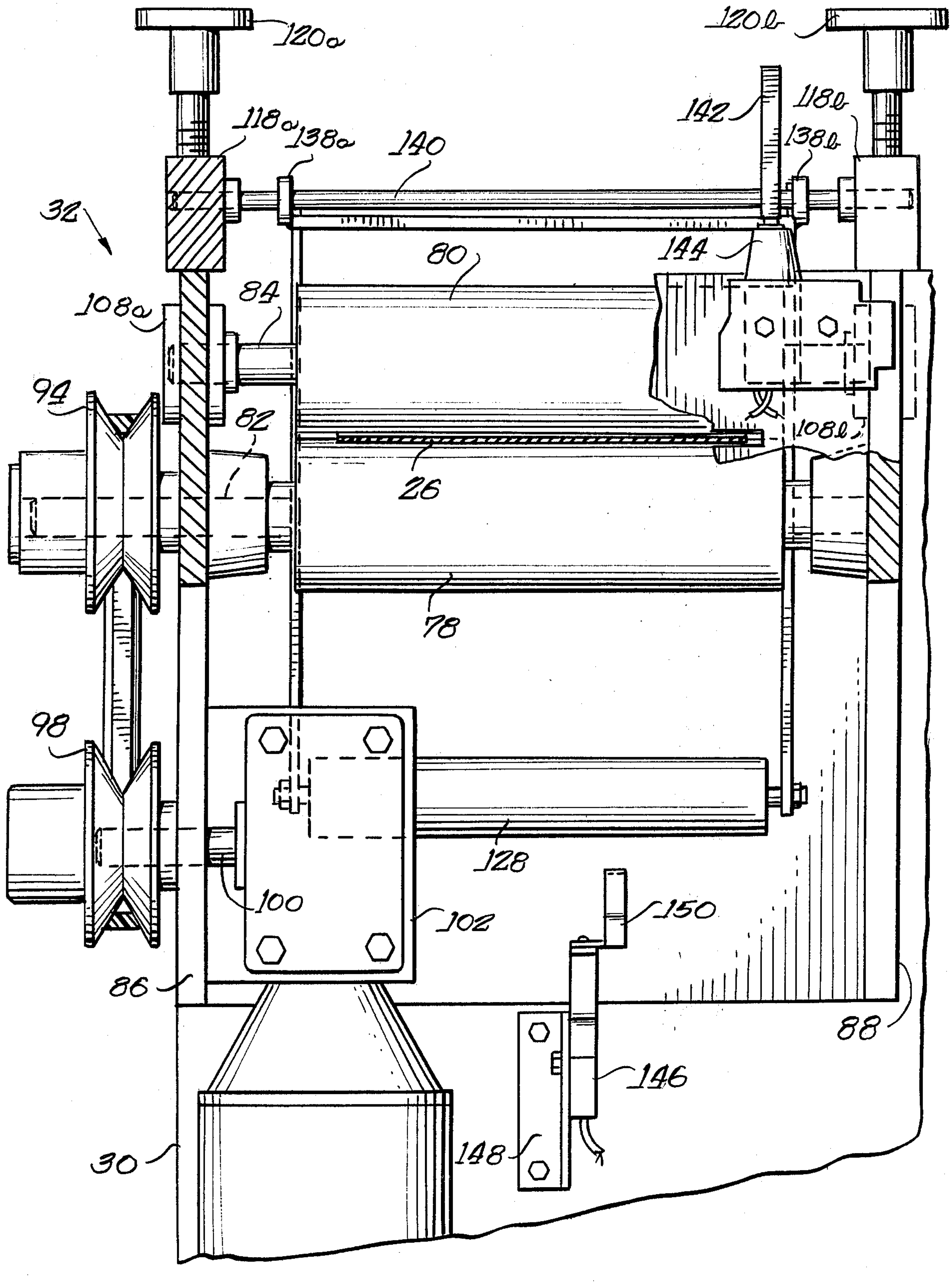
FIG. 7 is a sectional view taken along the line 7—7 of FIG. 5, looking in the direction of the arrows.

Referring to FIGS. 5-7, taken in conjunction with FIGS. 1 and 2, the material feed assembly 32 includes bottom and top feed rolls 78 and 80, respectively, which are supported on support shafts 82 and 84, respectively, between a pair of vertical frame plates 86 and 88 which form part of the base frame 30.

The bottom roll shaft 82 is journaled in bearings in the frame plates 86 and 88 and is driven continuously by a variable speed V-belt drive between a driven pulley 94 on the shaft 82 and a drive pulley 98 on the output shaft 100 of a gear motor 102.

The upper roll shaft 84 is journaled in bearing blocks 108*a* and 108*b* which are vertically slidable on the frame plates. The top feed roll 80 is urged against the bottom feed roll 78 by a pair of compression springs 112*a, b* confined between the bearing blocks 108*a, b* and hand screws 120*a, b* in retainer blocks 118*a, b* for adjusting the grip of the feed rolls on the fabric strip.

The folded fabric strip 26 is drawn from the fabric folder 24 through an elongated horizontal slot 122 (FIG. 2) in a cross plate 124 secured to and between the outer edges of the frame plates 86 and 88. After passing through the slot 122, the fabric strip 26 passes between the feed rolls 78 and 80 after which it passes downwardly beneath a sensing roll 128 and thence upwardly over a first idler roller 130 and under a second idler roller 132, the idler rollers serving as tension rolls and being rotatably supported in parallel relation between the frame plates 86 and 88.

Because feed rolls 78 and 80 draw the fabric strip 26 from the supply roll 28 at a predetermined constant rate, and the fabric strip 26 is drawn intermittently through the guide path by the indexing drive 54, a continuously varying loop is maintained in the fabric strip beneath the sensing roll 128 which serves to control the amount of slack and to maintain a substantially constant tension in the fabric strip. The sensing roll 128 is rotatably supported on the lower ends of a pair of support rods 136*a*, b the upper ends of which are pivotally secured, respectively, to a pair of pivot arms 138*a, b* fixed on a transverse rock shaft 140 journaled at its ends in the retainer blocks 118*a, b*. The sensing roll 128 bears against the fabric strip under the influence of gravity, moving up and down and maintaining substantially constant tension in the fabric strip as it advances intermittently through the pocket machine.

A switch actuator arm 142 fixed on the rock shaft 140 is adapted to actuate a control switch 144 when the take-up roller 134 is raised to a predetermined upper position representative of an inadequate feed rate of the feed rolls 78-80. The switch 144 is operative to deenergize the power supply to all functions in that event. A second switch 146 is supported by a switch support bracket 148 and has an actuating rod 150 adapted to be engaged by the sensing roll 128 should the fabric supply reel run out or too much slack occur at the exit side of the feed rollers 78 and 80. The switch 146 is connected in circuit with the gear motor 102 so that actuation of the switch control arm 150 by the roll 128 deenergizes the gear motor 102.

Figure 8:
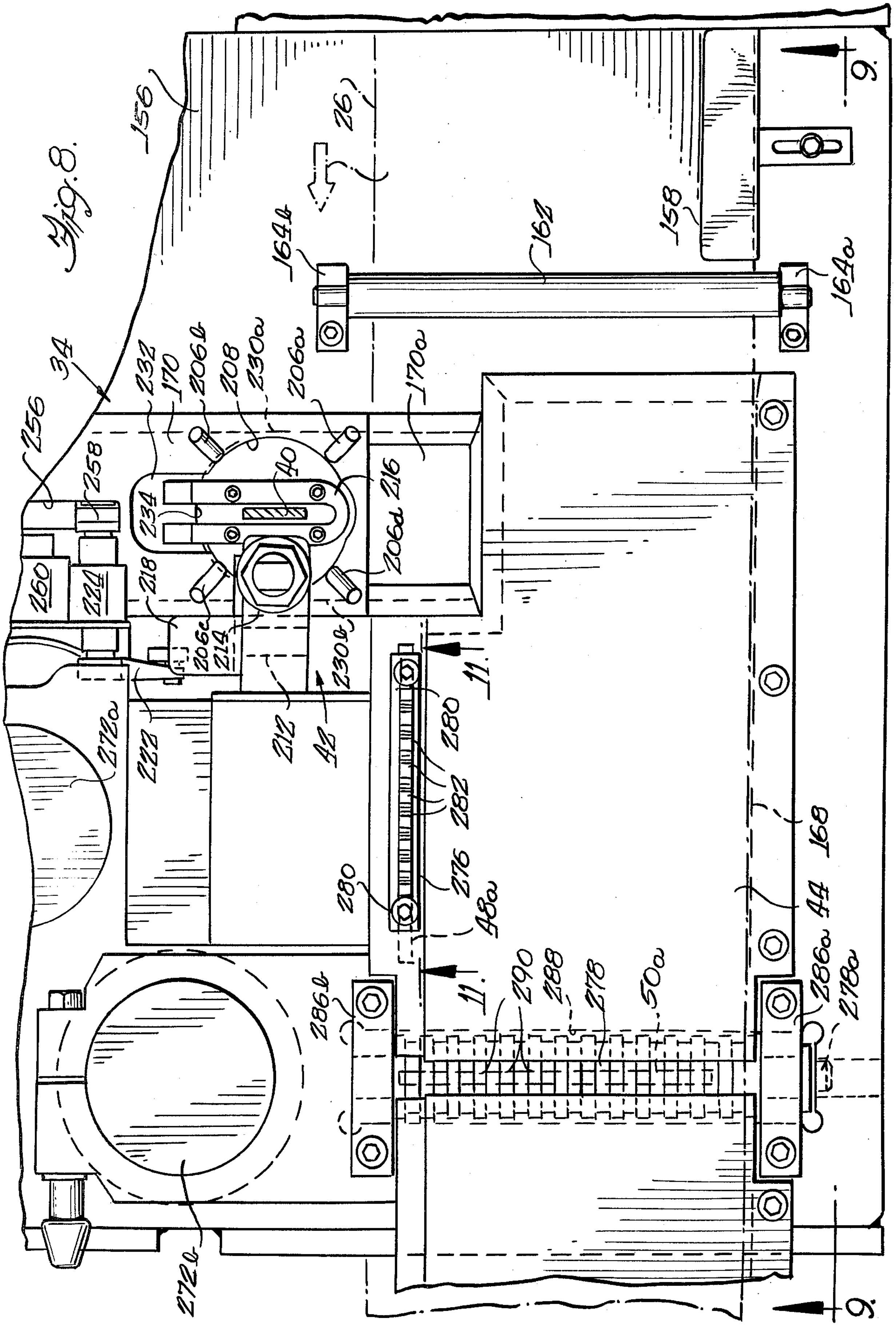
FIG. 8 is an enlarged fragmentary sectional view taken substantially along line 8—8 of FIG. 1, and showing the fabric guide path in plan.
Figures 9, 10:
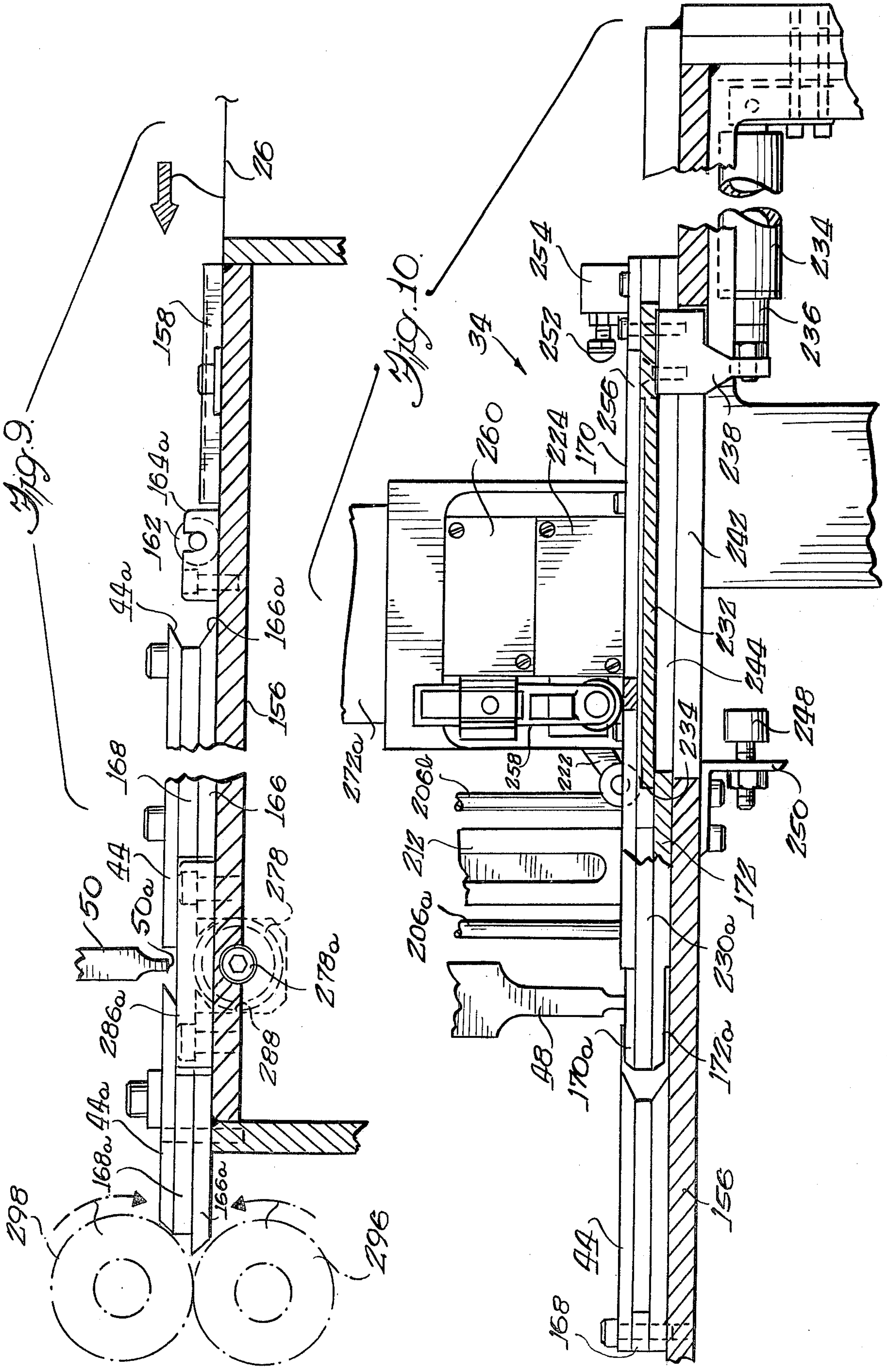
FIG. 9 is a fragmentary longitudinal sectional view taken substantially along line 9—9 of FIG. 8, looking in the direction of the arrows.
FIG. 10 is a fragmentary longitudinal sectional view of the guide path taken substantially along line 10—10 of FIG. 1, looking in the direction of the arrows.

Referring particularly to FIGS. 8 and 9, as the fabric strip 26 leaves the tension rolls 130 and 132, it is guided onto an upper plate 156 on the base frame 30 with the longitudinal fold edge thereof slidingly contacting an adjustable T-shaped guide member 158 to establish the desired initial orientation of the fabric strip along the plate 156. The fabric strip passes beneath a transverse hold-down roll 162 rotatably supported on the frame plate 156 through a pair of cradle support brackets 164*a, b*. The roll 162 grips the fabric strip against the plate 156 and prevents the fabric strip from moving backwards when the coil springs 36 are inserted between the fabric plies and open slightly after insertion.

From the hold-down roll 162, the fabric strip 26 passes between the upper coil retainer plate 44 and a lower coil retainer plate 166 which are mounted on the frame plate 156 and cooperate to define the major portion of the guide path through which the fabric strip passes on the base frame 30. The coil retainer plates 44 and 166 have transverse widths less than the transverse width of the fabric strip 26 and are maintained in spaced relation by a narrow spacer bar 168 which guides the longitudinal fold edge of the fabric strip. The spacer bar 168 may be interchanged with spacer bars of different transverse widths to accommodate different width fabric strips without major machine adjustments. The retainer plates 44 and 166 are beveled at their forward or right-hand edges, as indicated at 44*a* and 166*a* in FIG. 9, to facilitate entry of the fabric strip 26 therebetween.

As the fabric strip 26 enters the guide path between the upper and lower coil retainer plates 44 and 166, the free edges of the fabric plies pass over and under the forward end portions 170*a* and 172*a*, respectively, of an inserter cover plate 170 and an inserter base plate 172 which protrude transversely into the guide path. The inserted cover plate 170 and base plate 172 form part of the spring inserted assembly 34. The free edges of the fabric plies are thus separated to facilitate insertion of the compressed coil springs 36 by the spring inserter assembly 34 is a manner to be described.

SPRING COILER

The spring coiler assembly 38 is operative to automatically form the helical coil springs 36 in synchronized relation with the other functions of the pocket machine. The coiler assembly 38 may take any known form for accomplishing forming of wire coil springs as empolyed in the strip of pocketed springs 22, the coiler assembly, per se, forming no part of the present invention.

Briefly, the coiler assembly 38 in the illustrated embodiment includes a pair of cooperating feed rolls 176 and 178 which are rotatably driven at identical speeds through a suitable gear train from an electric coiler drive motor 180. The feed rolls 176 and 178 draw a continuous length of suitable spring wire 182 from a conventional wire supply reel through cooperating wire straightening rolls (not shown). The wire 182 is fed through a guide 184 after which the wire is formed into individual helical coil springs 36 about the upper end of the delivery horn 40 by conventional helical spring forming mechanism. As best seen in FIG. 1, the coil convolutions adjacent the opposite ends of the coil springs 36 are preferably made of smaller diameter than the intermediate coil convolutions.

The coiler assembly 38 is mounted on the base frame 30 such that the longitudinal axis of the coiler assembly is inclined angularly downwardly relative to the upper plate 156 of the base frame 30. The delivery horn 40 is an arcuate bar cantilevered at its upper end from the front support plate 190 of the coiler assembly. The lower end of the delivery horn is flattened into a blade (FIG. 8) which terminates at the upper cover plate 170 of the inserted assembly 34. After forming a coil spring 36 at the upper end of the delivery horn 40, the spring is ejected downwardly along the delivery horn by a jet of air from an orifice 192 in the coiler front support plate 190. As will become more apparent from the description of the control circuit of FIG. 15, the air jet orifice 192 has communication with a solenoid controlled air jet valve which is opened momentarily in timed relation to the operation of the coiler 38.

The coiler assembly 38 supports a master timer control, indicated generally at 196, which programs the various functions of the pocket machine in coordinated relation. The master timer control 196 includes a rotatable cam shaft 198 upon which are mounted or integrally formed six timing cams 200*a–f*, each of which controls an associated switch in the control circuit to be described in connection with FIG. 15. The cam shaft 198 is connected through a suitable coupling 202 and gear train to the output shaft of coiler motor 180 so that the control cams 200*a–f* rotate in predetermined relation to the coiler motor.

SPRING COMPRESSOR

As a coil spring 36 is delivered down the delivery horn 40 from the coiler 38, it is received within four upstanding spring guides 206*a–d* which are mounted on the inserter cover plate 170 around a spring-receiving opening 208 in the inserter cover plate 170 aligned with the end of the delivery horn. See FIGS. 8, 1 and 2. Operation of the spring compressor assembly 42 is controlled by the master timer control 196 so as to compress each spring 36 after it is received within the spring guides 206*a–d*. To this end, the compressor assembly 42 includes a vertical double-acting air cylinder 210 at the upper end of an upstanding guide bar 212 secured to the frame plate 156. A U-shaped compressor foot 216 at the lower end of the piston rod, normally poised above the blade portion of the delivery horn, flanks the flattened horn blade on the stroke of the piston rod, engaging and compressing a spring 36 disposed within the spring guides 206*a–d*.

Figure 15:
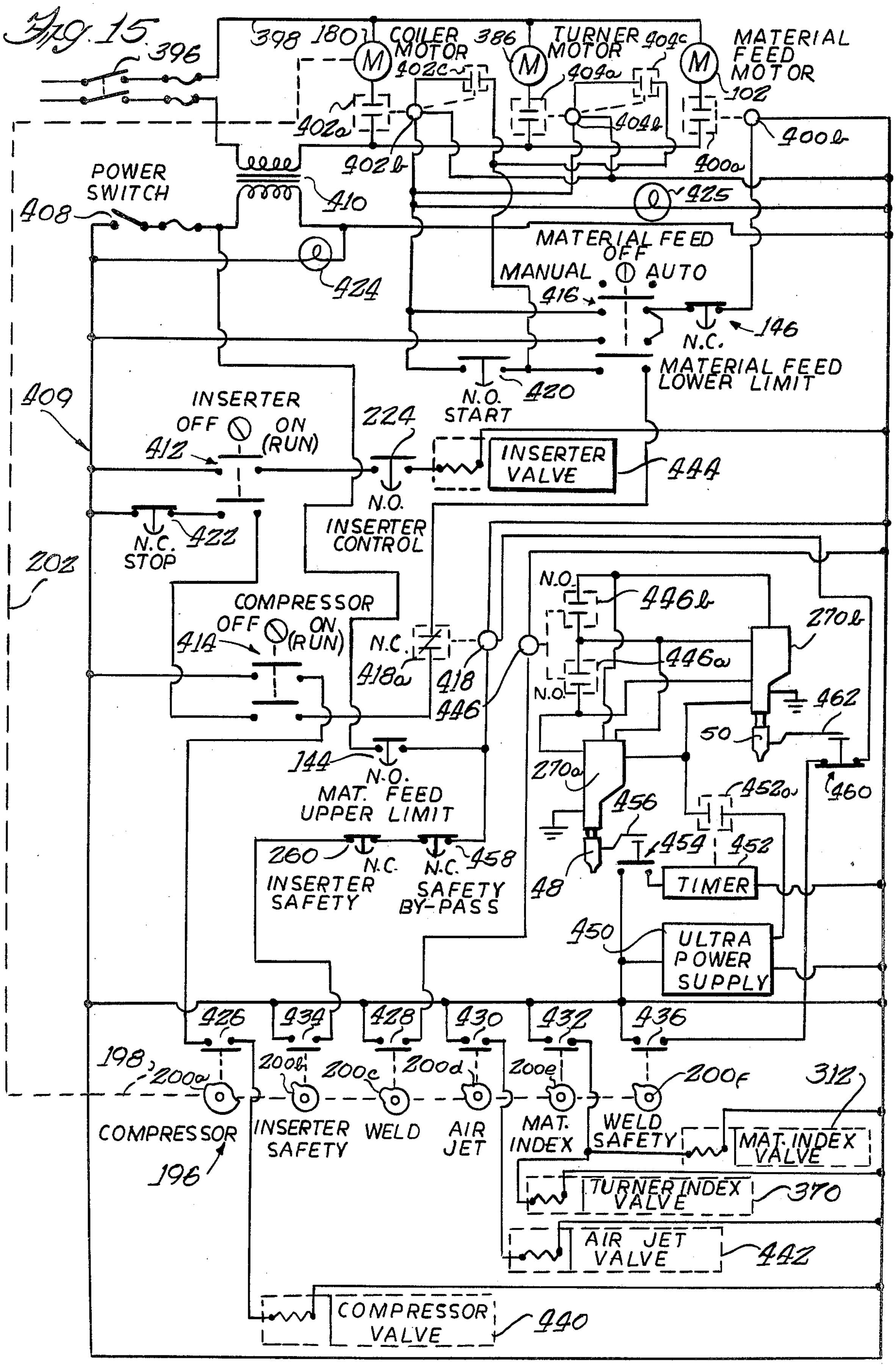
FIG. 15 is a schematic circuit diagram of a control circuit for use with the pocket machine of FIG. 1.

A switch operating lug 218 on the compressor foot 216 depresses the actuator arm 222 of an inserter control switch 224 to initiate operation of the inserter assembly when the compressor foot has fully compressed the spring, as will become apparent from the description of the control circuit of FIG. 15.

SPRING INSERTER

The aforementioned inserter cover plate 170 and base plate 172 are mounted on the frame plate 156 and are maintained in parallel spaced relation by laterally opposed spacer bars 230*a, b* which space the inserter cover plate above the base plate a distance substantially equal to and coplanar with the spacing between the upper and lower coil retaining plates 44 and 166, respectively. The spacer bars 230*a, b* cooperate with the inserter plates 170 and 172 to define therewith a slide passage which receives a slidable inserter plunger plate 232. The inserter plunger 232 has a generally semi-circular forward end surface 234 which serves to push a compressed coil spring 36 forwardly, out from under the compressor foot, and into the space between the inserter plates 170 and 172.

The inserter plunger 232 is moved by a double-acting horizontal air cylinder 234 (FIG. 10) which is mounted beneath the frame plate 156. The piston rod 236 of the cylinder is connected to the rearward end of the inserter plunger 232 through an adaptor bracket 238 which extends downwardly through elongated slots 242 and 244, respectively, in the frame plate 156 and the inserter base plate 172 to make the connection to the piston rod.

Actuation of the inserter operating cylinder is controlled by the aforenoted inserter control switch 224 which controls energizing of a solenoid actuated inserter valve to be described in connection with the control circuit of FIG. 15. Forward movement of the inserter plunger 232 is limited by an internal stop (not shown) within the operating cylinder 234. In addition, an adjustable bumper cushion 248 is mounted on the bottom of base plate 156 through an angle bracket 250 and serves to provide a shock absorbing cushion for the piston 236 during forward extension thereof.

A switch actuator 252, mounted in a block 254 on the inserter plunger 232 and movable within a slot 256 in the inserter cover plate 170, actuates the actuating arm 258 of an inserter safety switch 260 when the inserter plunger 232 is in its fully forward, spring-inserting position. As will be described hereinafter, the safety switch 260 is connected in the pocket machine control circuit so as to shut down the pocket machine if the inserter plunger 232 is prevented from moving forward to effect proper insertion of a compressed spring between the plies of the fabric strip 26. The spring inserter plunger 232 has a forward stroke sufficient to insert the compressed coil spring between the fabric plies to the depth indicated by FIG. 4, and the spring is maintained in the compressed condition between the plies by the overlying retainer plate 44 as the fabric strip with included springs subsequently advances along the guide path.

POCKET FORMING THERMAL WELD HEADS

As previously noted, the fabric strip 26 is a material capable of being thermally welded to itself. As the folded fabric 26 moves intermittently along the guide path between the upper and lower coil retaining plates 44 and 166, respectively, it carries with it the compressed springs 36 which were inserted at longitudinally spaced intervals by the inserter 34, and, in the interval between fabric movements, the thermal weld heads 48 and 50 descend to weld the overlying fabric plies together along longitudinal and transverse weld lines. The weld heads 48 and 50 are positioned "downstream " from the spring inserter and operated while the fabric strip is at rest to make the transverse welds 52*a–c*, etc., between successive springs.

The thermal welding heads or "horns" 48 and 50 are generally rectangular blocks with their opposite side surfaces necked inwardly to a narrow rectangular welding edge, as indicated in phantom at 48*a* and 50*a* in FIG. 8. The "longitudinal" weld head 48 and the "transverse" weld head 50 are each secured on the lower end of an associated actuator shaft 266*a, b*, each subjected to high frequency (circa 20,000 Hz) longitudinal vibration by an electrical transducer 268*a, b* in a known manner.

The actuator shafts 266*a, b* and their associated transducers 268*a, b* are each axially movable by a double-acting air cylinder (not shown) in the associated housing 270*a, b.* In the described embodiment, the thermal weld heads 48 and 50 comprise indentical ultrasonic welding horns which, with their associated actuator shafts 266*a, b,* transducers 268*a, b,* housings 270*a, b,* and internal operating cylinders and control solenoids, are of known design and of the type commercially available from any one of a number of manufacturers and distributors. Each of the housings 270*a, b* is vertically adjustable on an associated upstanding support column 272*a, b* affixed at its base to the frame plate 156.

The operation of the thermal weld heads 48 and 50 in synchronized relation to the other functions of the pocket machine 20 is controlled by the master timer control 196 in a manner to be described more fully in connection with the description of the control circuit of FIG. 15. Briefly, the weld heads 48 and 50 are simultaneously moved downwardly to press the fabric plies 26 against underlying anvils 276 and 278, respectively, at suitable engaging pressures between each intermittent advance of the fabric strip by the indexing roll assembly 54. The weld heads are energized prior to reaching their full downward weld positions so that they are undergoing maximum energization as they reach their weld positions, and thus require only momentary contact to effect the weld. A safety switch, to be hereinafter described, is operative to shut down the pocket machine if a spring is accidentally positioned between the transverse weld head 50 and its underlying mandrel 278 when movement of the weld heads to weld positions is initiated.

Figure 11:
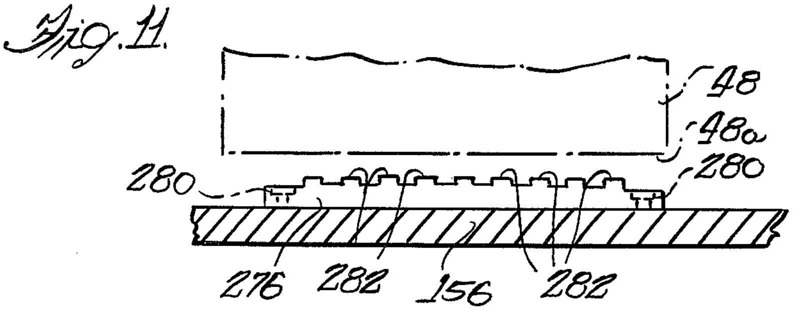
FIG. 11 is a fragmentary transverse sectional view of the guide path taken along line 11—11 of FIG. 8 showing the longitudinal weld head in operative association with its associated anvil.

Referring to FIGS. 8 and 11, the longitudinal weld anvil 276 is a metal strip screwed on the frame plate 156 to underlie the weld head 48. The upper surface of the anvil 276 is formed with equally longitudinally spaced lands 282 for cooperation with the planar weld edge 48*a* to effect the intermittent weld line 46 longitudinally along the free edge of the fabric strip. The anvil lands 282 are preferably configured to effect welds about ¼ inch long and spaced about ¼ inch apart, each weld being about ⅛ inch wide on its minor dimension.

Referring to FIGS. 8 and 9, the anvil 278 associated with the transverse weld head 50 is a cylindrical shaft supported transversely of the fabric guide path by a pair of bearing blocks 286*a, b* secured on the frame plate 156 so as to position the anvil 278 within a transverse opening 288 in the frame plate. The anvil 278 is rotatable about its longitudinal axis and has a plurality of axially spaced circumferential land surfaces 290 formed thereon which present a segmented or interrupted surface to the contact edge 50*a* of the weld head 50. The land surfaces 290 are equally spaced and are of equal longitudinal width so as to form weldments which are approximately ¼ inch in length, and spaced about ¼ inch apart along the transverse weld lines 52*a, b,* etc., and the contact edge 50*a* of the weld head has a width such that each weld is about ⅛ inch wide.

The anvil 278 has an axially extending end portion 278*a* having a hexagonal socket therein to facilitate rotation of the anvil as desired to present new land surface areas 290 to the weld head 50, desirable in the event of damage if a compressed spring 36 should become accidentally lodged between the anvil 278 and the weld head 50 so as to prevent proper movement of the transverse weld head downwardly to its weld position. In such event, the control circuit is operative to shut off the pocket machine, as earlier noted and later herein described.

It will be understood that the spring retainer plates 44, 166 and the spacer bar 168 are interrupted at the anvil 278 to provide a gap for access by the weld head 48, and are continued at 44*a,* 166*a* and 168*a,* "downstream" from the anvil 278. The latter maintains the springs in compressed condition to be fed into the indexing rolls.

INDEXING ROLL DRIVE

Figure 12:
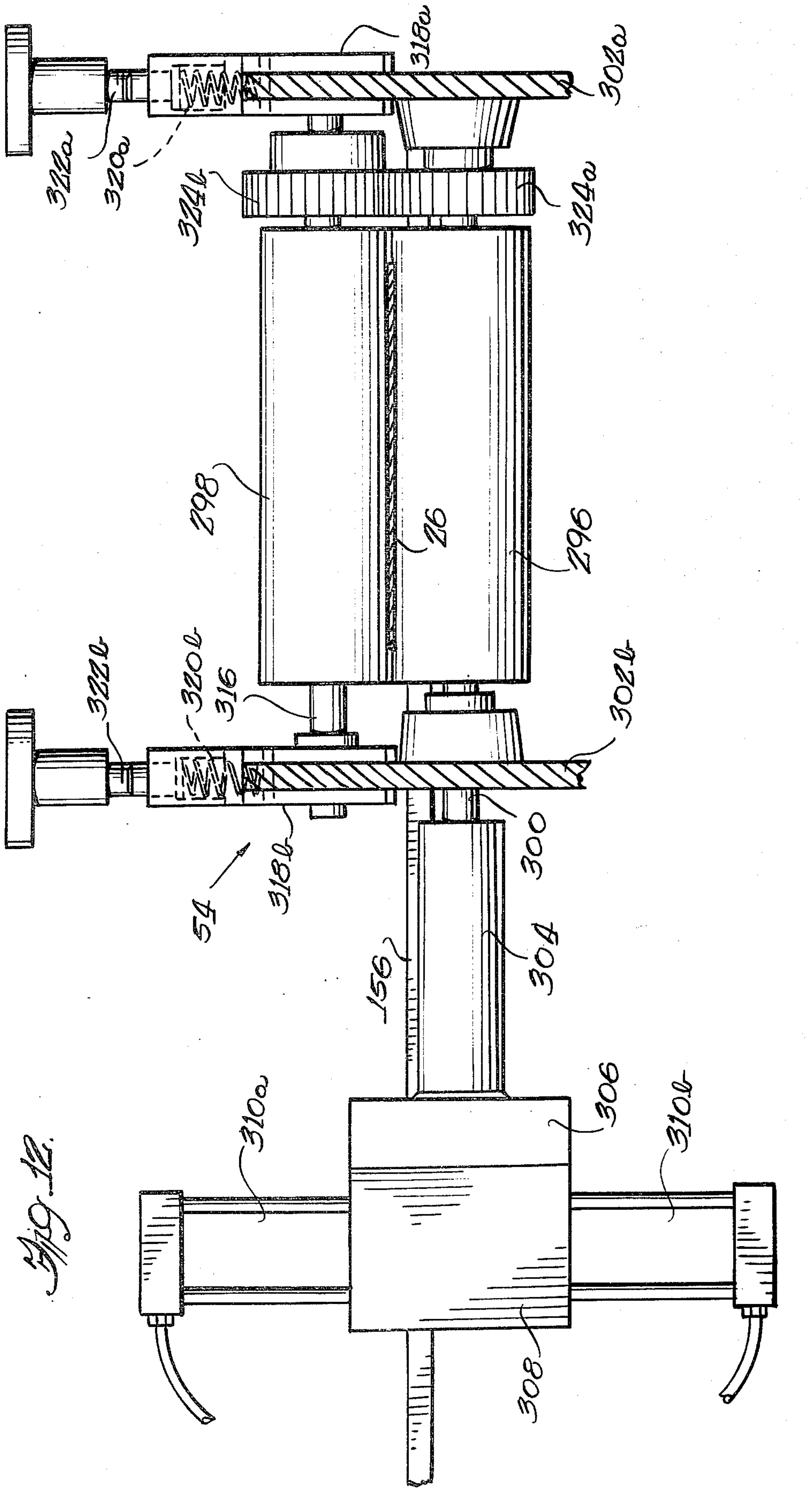
FIG. 12 is an enlarged vertical sectional view taken substantially along line 12—12 of FIG. 1 and illustrating the indexing roll assembly.
Figure 13:
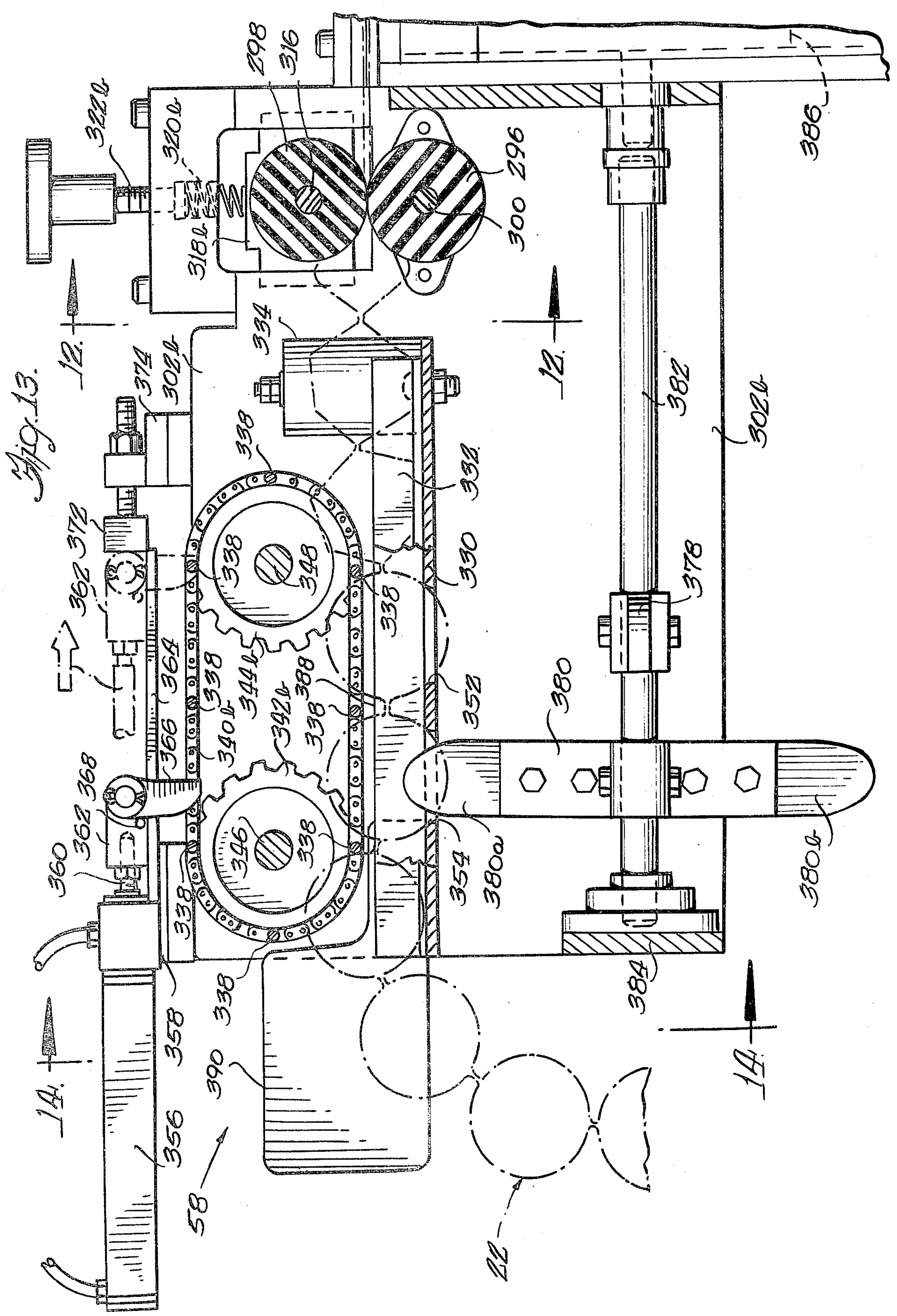
FIG. 13 is a partial longitudinal sectional view of the turner assembly, taken substantially along line 13—13 of FIG. 14 and looking in the direction of the arrows.

Referring to FIGS. 12 and 13, taken in conjunction with FIG. 1, the indexing roll assembly 54 for effecting intermittent movement of the fabric strip 26 includes lower and upper indexing rolls 296 and 298, respectively, which are preferably made of a suitable resilient material such as rubber. The lower indexing roll 296 has an axial shaft 300 rotatably supported between a pair of upstanding frame plates 302*a, b* secured to the base frame 30. The lower roll shaft 300 extends outwardly of the frame plate 302*b* and is connected through a coupling 304 to a one-way clutch 306 and associated rotary actuator 308. The clutch 306 and rotary actuator 308 are of known design, such as commercially available from PHD, INC., Fort Wayne, Indiana, and are operative to effect intermittent unidirectional rotation of the indexing roll 296 upon selective introduction of air pressure into the pneumatic cylinders 310*a, b* of the rotary actuator. To this end, the cylinders 310*a, b* are connected to a source of air pressure (not shown) through a solenoid operated index valve 312 (FIG. 15) in a manner to be described hereinafter in connection with the control circuit for the pocket machine. The index valve 312 is controlled by the master timer control 196 to effect the desired intermittent movement of the fabric strip 26 past the thermal weld heads 48 and 50.

The upper indexing roll 298 has an axial shaft 316 journaled in bearing blocks 318*a, b* which are vertically slidable on the frame plates 302*a, b.* The upper indexing roll 298 overlies the lower indexing roll 296 and is urged against the lower roll by a pair of compression springs 320*a, b* confined between the bearing blocks 318*a, b* and associate hand screws 322*a, b* which facilitate adjustment of the gripping force of the indexing rolls on the fabric strip. If desired, the indexing rolls 296 and 298 may be interconnected through spur gears 324*a, b,* although the resilient nature of the rolls and their gripping action on the fabric strip effects synchronized rotation thereof.

SPRING TURNER

Upon leaving the restraint of the indexing rolls 296 and 298, the pocketed coil springs re-expand partially to the extent permitted by their cross-wise orientation in the pockets, and pass immediately to the turner assembly 58 which turns the springs in the pockets until their longitudinal axes are disposed longitudinally of their respective spring pockets, i.e., transversely of the fabric strip.

Figure 14:
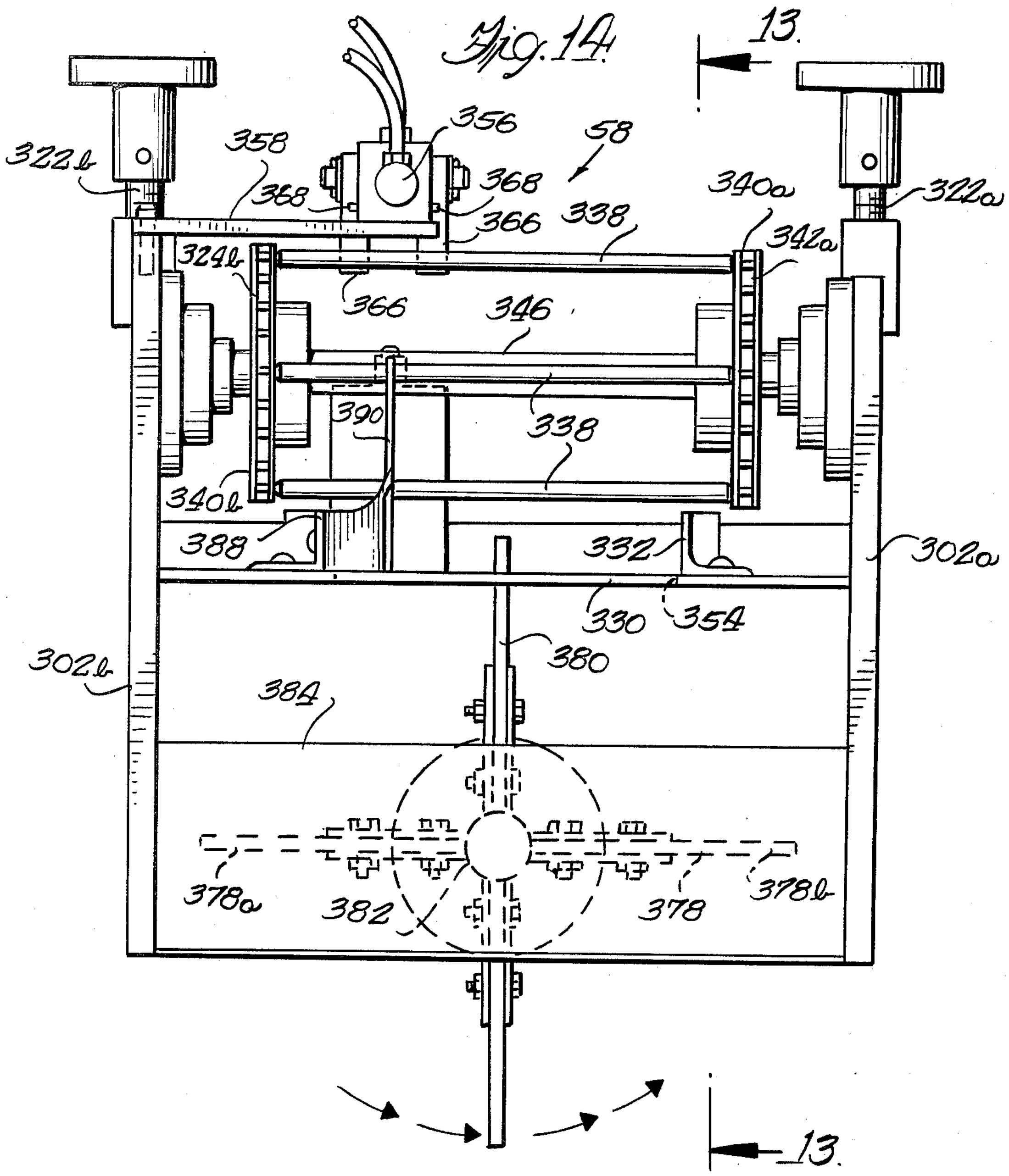
FIG. 14 is an end view of the turner assembly taken along line 14—14 of FIG. 13.

Referring to FIGS. 13 and 14, the turner assembly 58 includes a horizontal plate 330 supported between the frame plates 302*a, b.* A guide bar 332 is mounted on and extends longitudinally of the plate 330 for engaging the longitudinal fold edge of the fabric strip as it comes from the indexing rolls. A cylindrical roller 334 vertically mounted on plate 330 opposite the forward end of the guide bar 332 cramps the spring-filled strip to one side of the guide path, i.e. against the guide bar 332 as the strip traverses the turner assembly, to resist the side thrust of the turner paddles as they later beat the springs to turn them in the pockets. The coil springs can thus expand more readily into the unoccupied ends of their pockets during turning, with the result that turning of the springs is made easier and more uniform.

The pocketed springs are advanced through the turner assembly intermittently by a conveyor in the form of a plurality of transverse conveyor rods 338 which span a pair of parallel endless chains 340*a, b*. The carrier chains 340*a, b* are reeved about pairs of sprockets 342*a, b* and 344*a, b* fixed on transverse sprocket shafts 346 and 348 which are rotatably supported between the frame plates 302*a, b*.

The carrier chains 340*a, b* and associated conveyor rods 338 are positioned so that as the pocketed coil springs pass from the roller 334, each successive coil spring is "captured" between two adjacent conveyor rods on the lower runs of the chains, those rods also serving to confine the strip against the bed plate 330. The conveyor rods 338 intermittently advance each pocketed coil spring to successive positions overlying a first rectangular opening 352 in the plate 330 and, in the next advance movement, to a position overlying a second rectangular opening 354 in plate 330. The dimension of the openings 352 and 354, measured transversely of the fabric strip, is slightly greater than the expanded height of the springs 36 in their individual pockets after they are turned, and slightly less than the diameter of the coil springs 36 measured in the direction of strip movement.

As the spring turns in the pocket, the separation of the plies by the expansion of the spring reduces the distance between the transverse, pocket-defining welds, and requires a correspondingly reduced lineal feeding or indexing rate of the strip. To effect an appropriately reduced intermittent advance of the conveyor rods 338, a double-acting conveyor drive air cylinder 356 is mounted on a transverse support bar 358 secured to the upper edge of the frame plate 302*b*. The cylinder 356 has an axially extendible piston rod 360 which carries a pusher block 362 slidable along a guide bar 364 mounted on the support bar 358 in longitudinal alignment with the cylinder 356. The pusher block 362 carries a pair of pivoted push fingers 366, and has stop pins 368 mounted thereon to prevent clockwise rotation of the push fingers as seen in FIG. 13. The push fingers 366 engage successive conveyor rods 338 and push the rods along the path defined by the carrier chains 340*a, b* upon successive extensions of the piston rod 360. The operating cylinder 356 is connected to the air pressure supply (not shown) for the rotary actuator 308 through a solenoid operated control valve, indicated as the turner index valve 370 in FIG. 15, to extend and retract the piston rod 360. The control valve 370 is controlled by the master timer control 196 so as to effect movement of the conveyor rods 338 in synchronous relation with the other functions of the pocket machine as will be hereinafter described. An adjustable shock absorbing bumper 372 is preferably mounted on a transverse support bar 374 in axial alignment with the pusher block 362, and is adjusted to be engaged by the pusher block on extension of the piston 360.

As the pocketed coil springs 36 are advanced to successively overlie the openings 352 and 354, the coil springs are turned within their respective pockets by a pair of turner paddles 378 and 380 fixed on a turner shaft 382 rotatably supported between the base frame 30 and a cross plate 384 secured to the outer ends of the frame plates 302*a, b*. An electric drive motor 386 is mounted within the base frame 30 and is connected to the inner end of the turner shaft 382 to effect continuous rotation of the turner paddles. The turner paddles 378 and 380 underlie the openings 352 and 354, respectively, and have pliant end portions 378*a, b* and 380*a, b* adapted to extend upwardly through the openings 352 and 354 and "spank" the pocketed coil springs overlying the resepctive openings 352 and 354 during rotation of the turner paddles so as to turn the springs to positions wherein their longitudinal axes lie transverse to the fabric strip 26 and substantially in the plane of the transverse welds 52*a, b, c,* etc.

As noted, the cylindrical roller 334 urges the pocketed coil springs toward the longitudinal fold edge of the fabric strip as the pocketed springs are received between the conveyor rods 338 and approach the turner paddles 378 and 380. As the pocketed springs leave the roller 334 and reach the openings 352 and 354, the coil springs are turned and expand from their compressed conditions into the unoccupied ends of the respective spring pockets opposite the longitudinal fold edge. This has been found to make turning of the springs easier and also provides a more uniform orientation of the springs within their respective pockets along the length of strip 22 of connected pocketed springs.

To assist the guide bar 332 in guiding the fabric strip 26 and pocketed springs through the turner assembly 58, a second guide bar 388 is mounted on the plate 330 opposite and parallel to the guide bar 332. An upstanding guide blade 390 is mounted on the outer end of the guide bar 388 adjacent the exit side of the conveyor rods 338 and extends toward the guide bar 332 from the guide bar 388 so as to assist the roller 334 in cramping the spring-filled strip against the guide bar 332 as the strip traverses the turner assembly.

A feature of the turning assembly 58 is the provision of mounting the conveyor rods 338 in a manner to facilitate self-centering of the coil springs over the openings 352 and 354 as the springs are being turned. More particularly, as the pairs of conveyor rods 338 are advanced by the push fingers 366 and receive pocketed coil springs therbetween to advance the pocketed springs to positions overlying the openings 352 and 354, and as the springs are turned within their respective pockets, the conveyor rods 338 are free to move either forward or back along the fabric strip path and relative to the openings 352 and 354. If turning of a coil spring is effected while the spring only partially overlies an opening 352 or 354, e.g., the periphery of the helical spring engages only one of the transverse edges of the associated opening 352 or 354, the reaction force between the spring and the contacting edge of the underlying opening will move the spring in a direction to center the spring within its associated underlying opening. The conveyor rods 338, having only intermittent contact with the push fingers 336, are free to move either forward or back to accommodate such movement of a spring to a centered position over its associated opening 352 or 354 during turning.

ELECTRICALLY CONTROLLING THE CYCLIC OPERATION

Central to the operation of the pocket machine is the master timer control 196 (FIG. 2) which coordinates the various functions of the pocket machine in accordance with the circuit of FIG. 15.

The timer control shaft 198 and its associated timing cams 200*a–f* are coupled to one of the continuously rotating shafts of the coiler 38, and are thus indirectly driven by the coiler motor 180. The coiler motor 180 is prepared for operation by closing a double-pole single throw switch 396 to connect a suitably fused motor circuit 398 to a motor power supply, such as a 440 volt a.c. supply. The material feed motor 102, coiler motor 180 and turner motor 386 are connected across the motor power supply through relay contacts 400*a*, 402*a* and 404*a*, respectively, operable by their respective relay coils 400*b*, 402*b* and 404*b* in a control circuit 409. For simplification, the motors are shown as single phase but in actuality are three phase.

The control circuit 409 is energized by initially closing a manual switch 408 which connects the control circuit 409 to the secondary of a transformer 410 with primary winding in the motor power circuit 398, or one of its phases. A manually operated two-pole inserter switch 412, a manually operated two-pole compressor switch 414, and a manually operated four-pole material feed switch 416 are then actuated to "on" and "auto" positions, respectively, to close a circuit through their respective lower contacts and a set of normally closed relay contacts 418 to a manual "start" switch 420, which, when closed, energizes the relay coils 400*b*, 402*b* and 404*b* to close their respective contacts and energize the motors 102, 180 and 386. Suitable holding circuits including normally open relay contacts 402*c* and 404*c* connect the "hot" side of the start switch 420 to the relay coils 402*b* and 404*b*, respectively, to maintain the coiler motor 180 and turner motor 386 energized after momentary closing of the start switch.

A manual "stop" switch 422 is connected between the power supply and the lower contacts of inserter switch 412 to facilitate manual shut down of the motors. A signal light 424 is connected across the power switch 408 to indicate that control circuit 409 is conditioned for operation of the pocket machine, and a signal light 425 is connected to indicate power to the motors 102, 180 and 386.

Energizing the coiler motor 180 initiates rotation of the master timer cam 196 to effect a programmed sequence of operation of the various machine functions during each revolution of the timer cam. The timing cams 200*a*, *c*, *d* and *e* control, respectively, cam operated switches 426, 428, 430 and 432 which, in turn, control the coil compressor air cylinder 210, the weld heads 48 and 50, the spring ejector air jet from the orifice 192, the material indexing rolls 296 and 298, and the turner conveyor rods. The timing cams 200*b* and 200*f* control cam operated switch 434 and 436, respectively, which are connected in safety circuits with the coil motor 180 to shut down the pocket machine in the event that the inserter plunger 232 is prevented from fully inserting a compressed spring between the plies of the fabric strip 26, or in the event that the weld head 50 is prevented from moving to its full operating position as by a compressed spring 36 being disposed between the weld head 50 and its underlying anvil 278.

It is seen from the control circuit that the compressor cam operated switch 426 is connected to power through the upper contacts of compressor switch 414 and, when closed by cam 200*a* during each revolution thereof, energizes a solenoid operated compressor valve 440 to operate the compressor air cylinder 210. The compressor valve 440 is of conventional design, and spring loaded to maintain the compressor foot 216 in its raised position except when the switch 426 is closed during approximately half of each revolution of the cam 200*a*.

As previously described, the compressor cylinder 210 is actuated to compress the springs 36 after they are delivered down the horn 40 from the coiler 38 by air jets from the air orifice 192. The ejector air jets are timed with forming of the helical springs by the air jet cam 200d which closes its associated switch contacts 430 and energizes a solenoid operated air jet valve 442 once each revolution of the timer cam shaft 198 to connect the orifice 192 to a source of air pressure (not shown) after forming each spring 36.

As the compressor foot 216 compresses each spring 36, it closes the normally open inserter control switch 224 which completes a circuit through the upper contacts of the inserter switch 412 to a conventional solenoid operated inserter valve 444. The solenoid valve 444 is adapted to maintain the inserter plunger 232 in its retracted position except when the inserter control switch 224 is closed by the compressor foot.

Intermittent advance of the fabric strip 26 through the pocket machine is controlled by the material index cam 200*e* which closes its associated cam operated switch 432 to energize the material index valve 312 and turner index valve 370 and thereby actuate the rotary actuator 308 and air cylinder 356 once each revolution of the cam shaft 198. It will be understood that the compressor control cam 200*a* and the weld control cam 200c are synchronized with the index cam 200*e* to actuate the compressor air cylinder 210, inserter plunger 232, and the weld heads 48 and 50 when the fabric strip is in an at-rest condition, as aforedescribed.

Operation of the thermal weld heads 48 and 50 is controlled by the cam 200*c* which closes its associated timing switch 428 to energize a relay coil 446 and close associated relay contacts 446*a* and 446*b* to connect the weld heads to power during each revolution of the timing cam shaft 198. As previously mentioned, the weld heads 48 and 50 and their associated actuator shafts 266*a*, *b*, electrical transducer 268*a*, *b* and housings 270*a*, *b* are of known design, as is the ultrasonic power supply indicated at 450 in the circuit diagram as being energized when the switches 396 and 408 are closed. The housings 370*a*, *b* associated with the weld heads 48 and 50, respectively, enclose solenoid switches which, when energized through closing the relays 446*a* and 446*b* actuate pneumatic cylinders (not shown) internally of the housings to move the weld heads downwardly to engage the fabric strip 26 against the underlying anvils in predetermined adjustable pressure relation. The housings 270*a*, *b* also have internally connected electronic timers which control ultrasonic exposure (weld time) and clamping duration (hold time). Thus, energizing the relay coil 446 to close the relay contacts 446*a*, *b* will initiate downward movement of the weld heads 48 and 50.

In the control circuit diagram of FIG. 15, the aforementioned electronic timers internally of the housings 270*a*, *b* are shown schematically as a single conventional electrical timer 452 connected to power through a normally open switch 454 adapted to be closed by an actuator, shown schematically at 456, carried by the weld head 48 so as to close the switch 454 and energize the weld heads 48 and 50 prior to the weld heads reaching their full downward weld positions. Energizing the timer 452 closes associated relay contacts 452*a* to selectively connect the power supply 450 to the ultrasonics for the weld heads for the preselected time period.

It will be apparent from the circuit diagram that three safety circuits are provided in the control circuit to shut down the pocket machine on the occurrence of certain events. The normally opened material feed upper limit switch 144 is connected between the secondary of transformer 410 and the relay coil 418 so that if the sensing roll 128 should detect an inadequate feeding rate of the fabric strip, the relay contacts 418 will be opened to deenergize the material feed motor 102, the coiler motor 180 and the turner motor 386. The normally closed material feed lower limit switch 146 is connected between the material feed switch 416 and the material feed motor relay 400*b* so that if excessive slack is detected by the sensing roll 128, the switch 146 is opened and the material feed motor 102 is momentarily deenergized until the sensing roll is moved to a position wherein the switch 146 is again closed.

The inserter safety cam 200*b* is adapted to close its associated switch contacts 434 at the moment during each revolution of the control cam 198 that the inserter plunger 232 should be in its full forward spring inserting position, at which time the actuator 252 opens the normally closed inserter safety switch 260. If the inserter plunger 232 is prevented from movement to its full spring inserting position, such as by a fouled spring preventing full forward movement of the inserter plunger, the inserter safety switch 260 will not be opened and the pulse initiated through the switch 434 by the inserter safety cam 200*b* will energize the relay coil 418 and open the relay contacts 418*a* to deenergize the motors 102, 180 and 386. A normally closed safety bypass switch 458 is connected in series with the inserter safety switch 260 to the relay coil 418 and facilitates manual opening of the inserter safety circuit to the relay coil 418 so as to prevent shut down of the pocket machine if it is desired to continue operation without the inserted safety switch 260 being opened as aforenoted.

The weld safety cam 200*f* is adapted to close its associated switch 436 at the moment that the weld head 50 reaches its lower weld position. A normally closed switch 460 is mounted on the housing 270*b*, as seen in FIG. 1, associated with the weld head 50 and is adapted to be opened by an actuator 462 carried by the support shaft 260*b* when the weld head 50 reaches its lowered weld position. As seen in FIG. 15, the switch 460 is connected between the switch 436 and the relay coil 418 so that when the weld head 50 is in its desired weld position, the switch 460 is opened to prevent a momentary pulse to the relay coil 418 which would open the relay contacts 418*a* and deenergize the motors 102, 180 and 386. If the weld head 50 is prevented from free movement to its weld position, such as by a spring 36 being disposed between the weld head 50 and its underlying anvil, the switch 460 will not be opened and the pulse initiated by the weld safety cam 200*f* will energize the relay coil 418 and shut down the various motors.

It is seen that the material feed switch 416 has a manual position which is operative to connect the material feed motor relay 400*b* to the power supply without energizing the coiler motor 180 or turner motor 386, as is desirable in initially inserting the fabric strip through the pocket machine during set-up.

The power switches 396 and 408, inserter switch 412, compressor switch 414, material feed switch 416, signal lights 424 and 425, manual start switch 420, stop switch 422, and bypass switch 458 are preferably mounted on a console 462 mounted on the front of the base frame 30, as seen in FIGS. 1 and 2, to facilitate operator access to and observation of the various control switches and indicator lights.

CONCLUSION

In the foregoing description, it is believed that a full disclosure of a new method and machine for making series of pocketed coil springs in accordance with the present invention has been set forth. The pocket machine 20 in accordance with the present invention provides significant advances over the prior art machines for pocketing coil springs for making mattresses, cushions and the like. The use of thermal weld heads as above described to secure the fabric plies longitudinally and transversely of the fabric strip to individually pocket the coil springs provides significant production advantages over the known pocket machines. It has been found that the pocket machine 20 herein disclosed will produce pocketed springs at a production rate which exceeds that of conventional sewing pocket machines by about twenty percent on the basis of cycle time alone, but at a substantially greater advantage if the downtime of conventional pocket machines due to thread breakage is also considered.

The pocket machine 20 may also be utilized to make series connected pocketed springs of different sizes without substantial downtime in the machine to adjust or replace the various components thereof. For example, interchanging the spacer bar 164 with a spacer bar of different lateral width facilitates accommodation of fabric strips of different transverse width while still employing the weld heads 48 and 50 to effect the longitudinal and transverse pocket defining welds on the fabric strip to individually close or pocket the coil springs.

Additionally, varying the incremental rotational movement of the indexing rolls 368 and 388 through timing of the duration of air pressure supply to the rotary actuator with a simultaneous adjustment of the air pressure applied to the turner conveyor drive operating cylinder 424 allows selective adjustment in the width of the spring pockets formed, as considered along the longitudinal length of the fabric strip.

While a preferred embodiment of the pocketing machine 20 in accordance with the present invention has been illustrated and described, it will be understood to those skilled in the art that changes and modifications may be made therein without departing from the invention in its broader aspects. Various features of the invention are defined in the following claims.

What is claimed is:

1. Apparatus for making a series of coil springs pocketed within an elongate stretchable fabric strip comprised of at least two overlying plies capable of being thermally welded together, said apparatus comprising, in combination, means defining a guide path adapted to receive said fabric strip for longitudinal movement therealong, indexing drive means operative to engage and to advance said fabric strip intermittently along said guide path, inserter means adjacent said guide path means and operative to deposit a compressed coil spring between said plies, first thermal weld head means operatively associated with said guide path means and operative to thermally weld said two plies together along at least one weld line longitudinally of said strip adjacent to the edge thereof into which the spring is inserted, second thermal weld head means operatively associated with said guide path means and adapted to thermally weld said two plies together along weld lines transversely of said strip between successive springs, said weld lines defining an individual spring retaining pocket about each of said inserted springs, both of said thermal weld head means being positioned adjacent to said inserter means along said guide path in the direction of movement of said fabric strip to hold the stretchable fabric strip during the insertion of spring between the plies, said first and second weld heads being disposed adjacent to each other and being operated simultaneously to complete the spring retaining pocket at a location immediately adjacent and downstream of said inserter means, means associated with said guide path to maintain said springs in compression between said two plies until after the operation of said weld head means, and control means operatively associated with said indexing drive means, said inserter means, and said first and second weld head means operable to effect operation of said inserter means and said weld head means in unison and in alternate relation with said indexing drive means so as to insert the springs and to form the pockets while said fabric strip is intermittently at rest.

2. Apparatus as defined in claim 1 wherein said fabric strip comprises a double width strip folded upon itself longitudinally to form a two-ply strip having one longitudinal edge thereof defined by said fold, and wherein said first thermal weld head means is positioned to weld said two plies together longitudinally along the free edges of said plies opposite said fold.

3. Apparatus as defined in claim 1 including means for folding a length of fabric sheet along its longitudinal midline so as to form said fabric strip, and including material feed means adapted to continuously feed said strip longitudinally toward said guide path means, and sensing means responsive to the length of said fabric strip between said feed means and said indexing means for preventing further operation of the apparatus in the event of failure of the feed means to supply fabric strip and for interrupting operation of the feed means upon oversupply of fabric strip.

4. Apparatus as defined in claim 1 including coiler means adapted to form helically coiled springs, and means for delivering said coil springs to said inserter means in compressed condition for insertion between said fabric plies.

5. Apparatus as defined in claim 4 wherein said means for delivering said coil springs to said inserter means includes a delivery horn, and including air ejector means for initiating movement of said coil springs along said delivery horn to said inserter means.

6. Apparatus as defined in claim 1 wherein said first and second thermal weld head means each comprises an ultrasonic weld head.

7. Apparatus as defined in claim 6 further including means supporting said first and second ultrasonic weld heads for movement between nonoperating positions spaced from said fabric strip and operating positions engaging said fabric strip, and control circuit means operatively associated with said first and second weld heads and adapted to effect selective movement of said weld heads from their said nonoperating to their said operating positions, said control circuit means being adapted to energize said weld heads prior to reaching their said operating positions.

8. The apparatus of claim 1 wherein said inserter means and said first thermal weld head means are positioned along said guide path in the stated order on the same side thereof to enable said first weld head means to anchor the fabric plies during the insertion of the spring therebetween.

9. The apparatus of claim 1 including a serrated anvil mounted thereon for engagement with each said thermal weld means and cooperating therewith to form said spring pockets between the plies by intermittent longitudinal transverse lines of welding.

10. The apparatus of claim 6 in which the serrated anvil associated with at least the second weld head means is a shaft which is turned to provide a series of axially spaced peripheral lands which cooperate with the weld head means to establish the transverse lines of intermittent welds, the shaft being rotatable to present new land surfaces to said second weld head means.

11. Apparatus for making a series of coil springs pocketed within an elongate fabric strip comprised of at least two overlying plies capable of being thermally welded together, said apparatus comprising, in combination, means defining a guide path adapted to receive said fabric strip for longitudinal movement therealong, indexing drive means operative to engage and to advance said fabric strip intermittently along said guide path, inserter means adjacent said guide path means and operative to deposit a compressed coil spring between said plies, first thermal weld head means operatively associated with said guide path means and operative to thermally weld said two plies together along at least one weld line longitudinally of said strip adjacent to the edge thereof into which the spring is inserted, second thermal weld head means operatively associated with said guide path means and adapted to thermally weld said two plies together along weld lines transversely of said strip betwen successive springs, said weld lines defining an individual spring retaining pocket about each of said inserted springs, both of said thermal weld head means being positioned adjacnt to said inserter means along said guide path in the direction of movement of said fabric strip, means associated with said guide path to maintain said springs in compression between said two plies until after the operation of said first and second weld head means, control means operatively associated with said indexing drive means, said inserter means, and said first and second weld head means operable to effect operation of said inserter means and said weld head means in unison and in alternate relation with said indexing drive means so as to insert the springs and to form the pockets while said fabric strip is intermittently at rest, wherein said control means includes control circuit means operatively associated with said inserter means, said first and second thermal weld head means, and said indexing means and adapted to effect operation thereof in predetermined relation with each other during operation of said apparatus, said control circuit means including means for energizing said thermal weld head means, and further including safety switch means adapted to deenergize said thermal weld head means if said inserter means is prevented from fully inserting a coil spring between said fabric plies.

12. Apparatus as defined in claim 11 wherein said control circuit means further includes means for effecting movement of said first and second thermal weld head means from nonoperating positions spaced from said fabric strip to operating positions engaging said fabric strip, said control circuit means further including safety switch means operatively associated with said second thermal weld head means and operative to deenergize said second thermal weld head means if a coil spring should be disposed in the path of said second thermal weld head means when it is moved toward its said operating position.

13. In apparatus for turning compressed coil springs disposed within individual pockets formed between overlying plies of a fabric strip so that the springs are reoriented from first positions wherein their coil axis are substantially perpendicular to the planes of said plies to second positions wherein their coil axis are substantially parallel to the planes of said plies said apparatus including guide path means adapted to receive and guide a length of said fabric strip having a series of pocketed springs therein, means associated with said guide path means and operative to intermittently advance said pocketed springs to a turning station, and turner means at said turning station operative to engage said fabric strip and effect turning of said springs from said first positions to said second positions; the combination therewith comprising spring positioning means operatively associated with said turner means and adapted to cramp said fabric strip toward one side of the guide path in opposition to the force exerted upon the strip by said turner means so that said springs expand into opposite ends of their respective pockets during turning thereof, said spring positioning means including a roller member supported for rotation about an axis substantially normal to the plane of said fabric strip in said guide path at one side of center thereof as said strip approaches said turning station, said roller member being positioned to engage said strip in a manner to urge said fabric strip with contained springs toward the side of the guide path opposite said roller.

14. A method for making a series of connected pocketed coil springs comprising the steps of intermittently advancing two overlying plies of thermally weldable fabric strip along a predetermined guide path, successively inserting a plurality of compressed coil springs between said two overlying plies of thermally weldable fabric strip when said strip is at rest so that said springs are spaced longitudinally along said strip, maintaining the compression of said springs and thermally welding said fabric plies together with contact pressure simultaneously along weld lines transversely of said strip between successive inserted springs and longitudinally of said strip along the edge thereof into which the springs are inserted when said strip is at rest so as to form a retaining pocket about each of said springs while the springs are compressed and at a location immediately adjacent to and downstream of the insertion of the compressed spring between the plies, said contact pressure holding said edge in place at a location downstream in the advancing direction and closely adjacent to the path of movement of the compressed spring during its insertion.

15. The method as defined in claim 14 including the step of folding a strip of thermally weldable fabric longitudinally thereof so as to form said overlying plies, said step of thermally welding said fabric plies together longitudinally of said strip comprising forming a thermal weld line longitudinally of said strip adjacent the edges of said plies opposite said longitudinal fold.

16. The method as defined in claim 15 including the step of intermittently advancing said fabric strip along a guide path, said coil springs being inserted between said plies when said fabric strip is intermittently at rest.

17. The method as defined in claim 14 wherein said step of inserting said springs includes the preliminary step of axially compressing said springs before insertion between said plies, and thereafter inserting said compressed springs between said plies so that the axes of said springs are substantially normal to the planes of said plies.

18. The method as defined in claim 17 including the further step of turning said springs within said pockets after forming said pockets so that the axes of said springs are substantially transverse to the longitudinal axis of said strip.

19. The method as defined in claim 18 wherein said step of turning said springs within said pockets comprises contacting said fabric strip with a rotating beater, and including the step of urging said fabric strip in a direction opposing the force exerted on said fabric strip by said rotating beater.

20. Apparatus for making a series of coil springs pocketed within an elongate fabric strip comprised of at least two overlying plies capable of being thermally welded together, said apparatus comprising, in combination, means defining a guide path adapted to receive said fabric strip for longitudinal movement therealong, indexing drive means operative to engage and to advance said fabric strip intermittently along said guide path, inserter means adjacent said guide path means and operative to deposit a compressed coil between said plies, first thermal weld head means operatively associated with said guide path means and operative to thermally weld said two plies together along at least one weld line longitudinally of said strip adjacent to the edge thereof into which the spring is inserted, second thermal weld head means operatively associated with said guide path means and adapted to thermally weld said two plies together along weld lines transversely of said strip between successive springs, said weld lines defining an individual spring retaining pocket about each of said inserted springs, both said thermal weld head means being positioned adjacent to said inserter means along said guide path in the direction of movement of said fabric strip, means associated with said guide path to maintain said springs in compression between said two plies until after the operation of said weld head means, and control means operatively associated with said indexing drive means, said inserter means, and said first and second weld head means operable to effect operation of said inserter means and said weld head means in unison and in alternate relation with said indexing drive means so as to insert the springs and to form the pockets while said fabric strip is intermittently at rest, and a continuously rotating beater which flails the fabric strip transversely thereof after the pockets have been formed about the springs and the springs have been released for expansion within their pockets, said beater serving to turn the springs within the pockets to position their axis transversely of the strip to expand into the opposite ends of said pockets, and upstanding roller positioned to contact the fabric along one side edge thereof before the strip enters the zone of the beater to cramp the strip toward the opposite side of the guide path in opposition to the force exerted on the strip by the beater.

* * * * *

UNITED STATES PATENT AND TRADEMARK OFFICE

CERTIFICATE OF CORRECTION

PATENT NO. : 4,439,977

DATED : April 3, 1984

INVENTOR(S) : Walter Stumpf

It is certified that error appears in the above-identified patent and that said Letters Patent is hereby corrected as shown below:

In the Abstract, line 6, change "piles" to --plies--.

line 9, change "transversly" to --transversely--.

Column 6, line 47, change "is" to --in--.

Column 6, line 55, change "empolyed" to --employed--.

Column 7, line 13, change "inserted" to --inserter--.

Column 9, line 7, change "indentical" to --identical--.

Column 10, line 46, change "associate" to --associated--.

Column 12, line 50, change "therbetween" to --therebetween--.

UNITED STATES PATENT AND TRADEMARK OFFICE

CERTIFICATE OF CORRECTION

PATENT NO. : 4,439,977

DATED : April 3, 1984

INVENTOR(S) : Walter Stumpf

It is certified that error appears in the above-identified patent and that said Letters Patent is hereby corrected as shown below:

In the Claims,

Column 18, line 41, change "betwen" to --between--.

Column 18, line 44, change "adjacnt" to --adjacent--.

Signed and Sealed this

*Twelfth* Day of *February 1985*

[SEAL]

*Attest:*

DONALD J. QUIGG

*Attesting Officer* *Acting Commissioner of Patents and Trademarks*